United States Patent
Hironaka et al.

(10) Patent No.: US 7,178,008 B2
(45) Date of Patent: Feb. 13, 2007

(54) REGISTER ACCESS SCHEDULING METHOD FOR MULTI-BANK REGISTER FILE OF A SUPER-SCALAR PARALLEL PROCESSOR

(75) Inventors: Tetsuo Hironaka, Hiroshima (JP); Mattausch Hans Juergen, Higashi-hiroshima (JP); Takeshi Hiramatsu, Hatsukaichi (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 540 days.

(21) Appl. No.: 10/370,172

(22) Filed: Feb. 18, 2003

(65) Prior Publication Data

US 2003/0200422 A1    Oct. 23, 2003

(30) Foreign Application Priority Data

Apr. 19, 2002    (JP)    ............................ 2002-117913

(51) Int. Cl.
   G06F 9/30    (2006.01)
   G06F 9/40    (2006.01)
   G06F 15/00    (2006.01)

(52) U.S. Cl. .................................................... 712/215
(58) Field of Classification Search ................. 712/215
   See application file for complete search history.

(56) References Cited

U.S. PATENT DOCUMENTS 6,742,111 B2 * 5/2004 Soni ........................... 712/217
6,938,149 B2 * 8/2005 Kunimatsu et al. ......... 712/217

OTHER PUBLICATIONS

Mattausch, H.J., "Hierarchical Architecture for Area-Efficient Integrated N-Port Memories With Latency-Free Multi-Gigabit Per Second Access Bandwidth," *Electronics Letters* 35(17):1-2, 1999.

Mattausch, H.J., and K. Yamada, "Application of Port-Access-Rejection Probability Theory for Integrated N-Port Memory Architecture Optimisation," *Electronics Letters* 34(9):861-862, 1998.

Mattausch, H.J., et al., "Area-Efficient Multi-Port SRAMs for On-Chip Data-Storage With High Random-Access Bandwidth and Large Storage Capacity," *IEICE Transactions on Electronics* E84-C(3):410-417, 2001.

Tatsumi, Y., and H.J. Mattausch, "Fast Quadratic Increase of Multiport-Storage-Cell Area With Port Number," *Electronics Letters* 35(25):1-2, 1999.

* cited by examiner

*Primary Examiner*—Eddie Chan
*Assistant Examiner*—Brian Johnson
(74) *Attorney, Agent, or Firm*—Christensen O'Connor Johnson Kindness PLLC

(57) ABSTRACT

A parallel processor has a plurality of operation units that execute operation instructions, and a multi-bank register file in which a plurality of banks each having a plurality of registers are formed. Each of machine instructions, which are input simultaneously, is split into a plurality of nano-instructions each of which includes at least one of an access instruction and operation instruction. The output clock cycles of operation instructions with respect to the operation units are arbitrated. Furthermore, the output clock cycles of access instructions to the multi-bank register file are arbitrated so as to prevent access instructions from contending in an identical bank in the multi-bank register file.

6 Claims, 6 Drawing Sheets

REGISTER ACCESS SCHEDULING METHOD FOR MULTI-BANK REGISTER FILE OF A SUPER-SCALAR PARALLEL PROCESSOR

CROSS-REFERENCE TO RELATED APPLICATIONS

This application is based upon and claims the benefit of priority from the prior Japanese Patent Application No. 2002-117913, filed Apr. 19, 2002, the entire contents of which are incorporated herein by reference.

BACKGROUND OF THE INVENTION

1. Field of the Invention

The present invention relates to a parallel processor which simultaneously executes a plurality of instructions in one clock cycle.

2. Description of the Related Art

For example, a parallel processor represented by a super scalar processor and VLIW (very long instruction word) processor simultaneously executes a plurality of instructions in one clock cycle. In order to supply information (data) used in the plurality of instructions to an operational element and to receive data from the operational element, a register file that temporarily stores a large number of data items is required in the parallel processor.

For example, in order to execute a single instruction such as addition (a+b=c), subtraction (a−b=c), or the like, three operands a, b, and c are required. Therefore, the register file, a multi-port register file having three ports (input/output terminals) is required per instruction.

For example, in a parallel processor that simultaneously executes four instructions, the multi-port register file must have 12 ports. Furthermore, in a parallel processor that simultaneously executes eight instructions, a multi-port register file having 24 ports is required.

In general, the required packaging area of a register file having a given storage size increases in proportion to the square of the number of ports (input/output terminals). Therefore, since the parallel processor that includes this multi-port register file becomes bulky as a whole, not only the manufacturing cost rises, but also the wiring length increases, thus causing deterioration in characteristics such as an operation speed drop of the processor. For this reason, the number of instructions to be executed simultaneously cannot be easily increased.

To solve such a problem, the following measures (a) and (b) have been examined for a register file to be incorporated in a parallel processor.

(a) The number of ports is increased by adopting a plurality of copies of a register file.

(b) A multi-bank register file is adopted.

However, if measure (a) is taken, the number of ports can be increased, but problems such as an increase in packaging area remain unsolved.

In contrast, if measure (b) is taken, the number of ports per bank to/from which data is input/output can be fixed to a minimum. Furthermore, since respective data can be stored in different registers by switching banks, the packaging area can be greatly reduced compared to a conventional multi-port register file.

However, since a parallel processor simultaneously executes a plurality of instructions, instructions to be executed simultaneously are more likely to access registers that belong to an identical bank, and access delay may increase due to bank access contention. Therefore, the number of instructions to be executed simultaneously cannot be easily increased. In order to reduce the frequency of occurrence of bank access contention, the number of banks can be increased. However, if the number of banks is increased, the required storage size of the whole multi-bank register file increases unwantedly.

BRIEF SUMMARY OF THE INVENTION

It is an objective of the present invention to provide a parallel processor which can incorporate a multi-bank register file by arbitrating the execution timings of input instructions and devising the configuration of the multi-bank register file, can easily increase the number of instructions to be executed simultaneously without increasing the arrangement of the entire device, can maintain a high operation speed, and can reduce the manufacturing cost.

In order to achieve the above objective, a parallel processor which simultaneously executes a plurality of instructions in one clock cycle according to a first aspect of the present invention, comprises an instruction change unit, which splits each of a plurality of simultaneously input machine instructions into a plurality of nano-instructions, each of which includes at least one of an access instruction and an operation instruction; a plurality of operation units which execute operation instructions split by the instruction change unit; a multi-bank register file in which a plurality of banks each having a plurality of registers are formed, and which is accessed by an access instruction which is split by the instruction change unit and designates a bank and register; a plurality of operation arbitrators, which are interposed between the instruction change unit and the operation units, and arbitrate output clock cycles of operation instructions output from the instruction change unit with respect to the operation units; an access arbitrator which is interposed between the instruction change unit and the multi-bank register file, and arbitrates output clock cycles of respective access instructions with respect to the multi-bank register file so as to prevent the access instructions simultaneously output from the instruction change unit from contending in an identical bank; and an execution result bus which feeds back access results to the multi-bank register file, and operation results in the operation units to the operations and access arbitrators.

In the parallel processor with the above arrangement, machine instructions input simultaneously are split into a plurality of nano-instructions, each of which includes at least one of an access instruction and operation instruction. The execution timing of each nano-instruction is arbitrated among all nano-instructions as well as those of other machine instructions. Therefore, if an execution wait time of a nano-instruction is generated in the process of executing nano-instructions, which in turn belong to a given machine instruction, nano-instructions which belong to other machine instructions can be executed.

More specifically, since an access instruction to the multi-bank register file and an operation instruction to each operation unit are considered to be an identical function level, high-speed processing of the whole parallel processor can consequently be achieved.

The access arbitrator is provided to arbitrate the output clock cycles of respective access instructions with respect to the multi-bank register file so as to prevent any contention among access instructions simultaneously output from the instruction change unit in a single bank. Hence, even when instructions that access registers which belong to an identical bank are generated, the execution timings of these instructions are automatically arbitrated, thus greatly reducing the probability of bank access contention.

A parallel processor according to the second aspect of the present invention comprises: a multi-bank register file in which a plurality of banks, each of which incorporates a plurality of registers, are formed; and execution means for simultaneously executing a plurality of access instructions that designate bank addresses and a register address in each bank with respect to the multi-bank register file in one clock cycle.

The multi-bank register file includes: a plurality of banks; a bank row select circuit which outputs a bank row select signal to respective banks that belong to a row designated by the bank address; a bank column select circuit which outputs a bank column select signal to respective banks that belong to a column designated by the bank address; and a bank read/write circuit which executes access to a register designated by the register address in the bank designated by the bank row and column select signals.

In a parallel processor according to the third aspect of the present invention, the multi-bank register file has the aforementioned structure. Furthermore, each bank includes a plurality of registers; a register row select circuit which outputs a register row select signal to respective registers that belong to a row designated by the register address designated by the bank read/write instruction circuit; a register column select circuit which outputs a register column select signal to respective registers that belong to a column designated by the register address designated by the bank read/write instruction circuit; and a register read/write circuit which executes an access, instructed by the bank read/write instruction circuit, to the register designated by the register row and column select signals.

In the parallel processor with the above arrangement, the packaging area of the multi-bank register file which simultaneously accesses a plurality of times in one clock cycle can be reduced. Further, since the multi-bank register file adopts a structure in which the banks and registers are arranged hierarchically, the packaging area of the multi-bank register file can be further reduced.

Additional objectives and advantages of the invention will be set forth in the description which follows, and in part will be obvious from the description, or may be learned by practice of the invention. The objectives and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described hereinafter with reference to the accompanying drawings.

Figure 1:
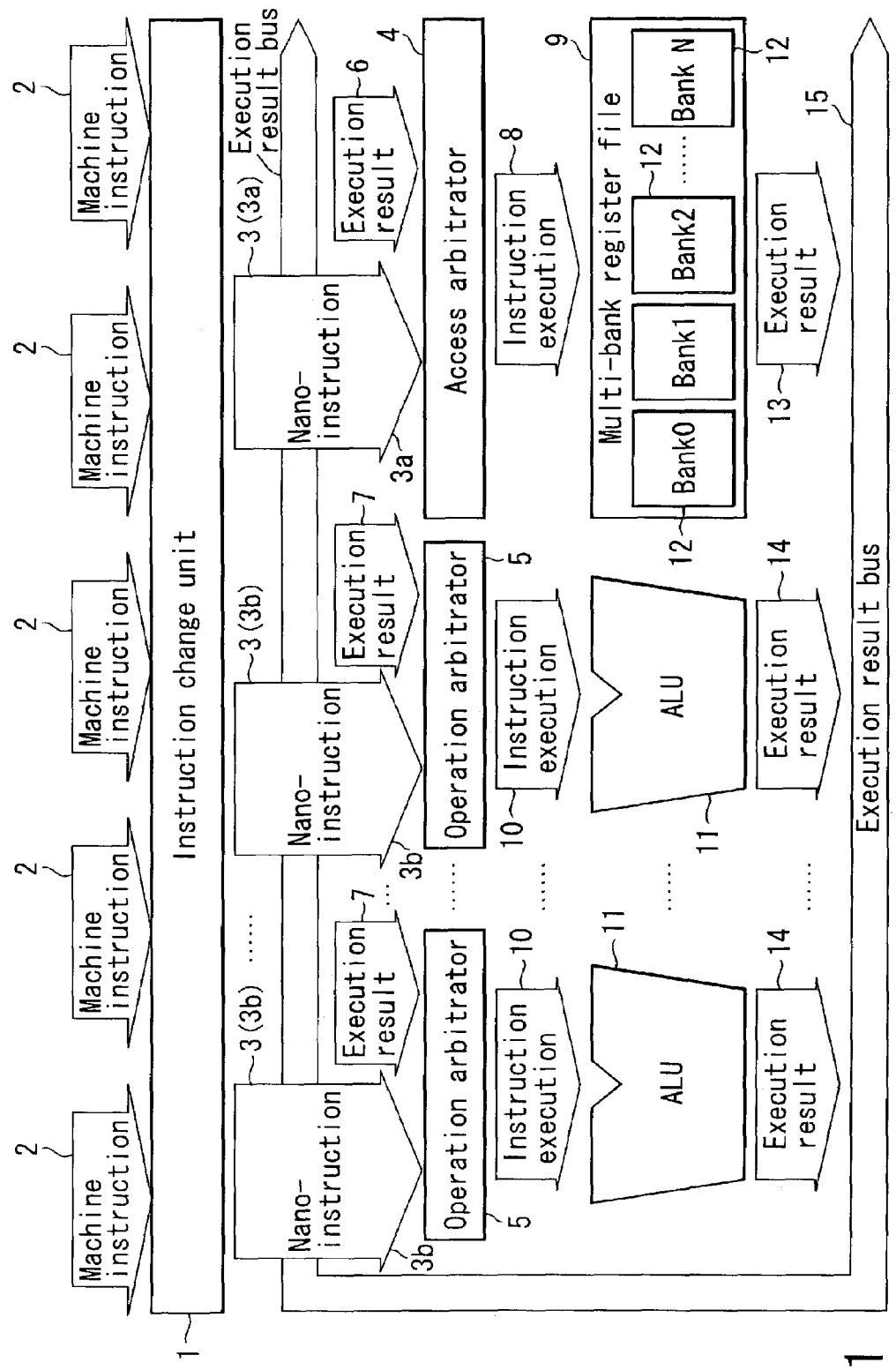
FIG. 1 is a schematic block diagram showing the arrangement of a parallel processor according to a first embodiment of the present invention.

FIG. 1 is a schematic block diagram showing the arrangement of a parallel processor according to the first embodiment of the present invention. The parallel processor of the first embodiment has a function of simultaneously executing a plurality of machine instructions 2, which are externally input in one clock cycle.

Each machine instruction 2 externally input to the parallel processor is input to an instruction change unit 1. The instruction change unit 1 splits each machine instruction 2 into a plurality of nano-instructions 3, each of which includes at least one of an access instruction and operation instruction. Each access instruction 3a of the nano-instructions 3 split by the instruction change unit 1 is input to an access arbitrator 4. Each operation instruction 3b of the nano-instructions 3 is input to a designated operation arbitrator 5.

The access arbitrator 4 executes (instruction execution 8) each input access instruction 3a with respect to a multi-bank register file 9. In this case, the access arbitrator 4 arbitrates the timings of execution clock cycles of respective access instructions 3a so as to prevent the access instructions 3a from contending in a single bank 12 in the multi-bank register file 9.

Also, when an input access instruction 3a is a write instruction, data to be written thereby is given by an execution result 14 of an operation, and the execution result 14 is not given yet as a new execution result 6 from an execution result bus 15, the access arbitrator 4 arbitrates the clock cycle of output (instruction execution 8) of this access instruction 3a with respect to the multi-bank register file 9.

Figure 4:
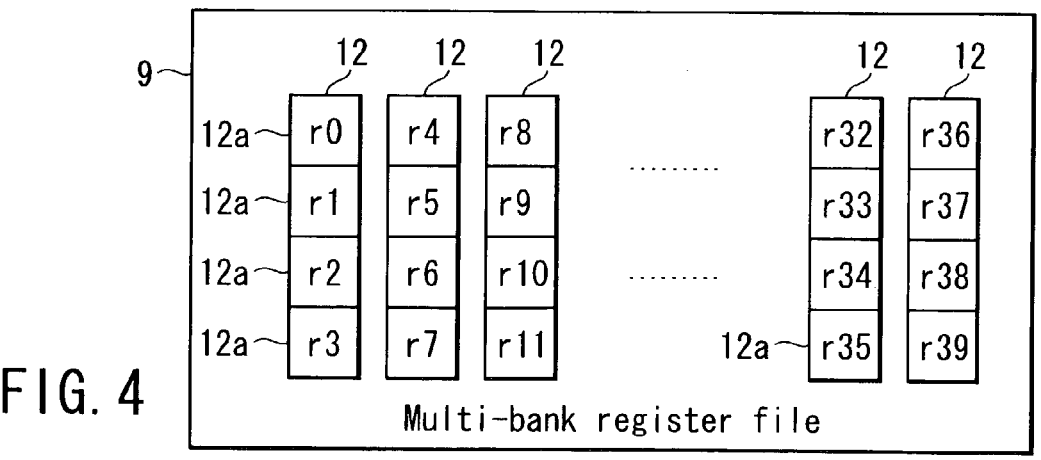
FIG. 4 shows the bank configuration of a multi-bank register file incorporated in the parallel processor of the first embodiment.

In the multi-bank register file 9, a plurality of banks 12 each consisting of a plurality of (for example four) registers 12a are formed, as shown in FIG. 4. An execution result 13 which consists of data read out from respective registers 12a in response to read instructions of access instructions 3a (read instructions [read] or write instructions [write]) executed for the multi-bank register file is output to the execution result bus 15.

Each operation arbitrator 5 executes (instruction execution 10) an operation instruction 3b input to itself with respect to a corresponding operation unit (ALU) 11. Furthermore, when an input operation instruction 3b is an operation instruction that uses an execution result 13 of access made with respect to the multi-bank register file 9, and the execution result 13 is not given as a new execution result 7 via the execution result bus 15 yet, each operation arbitrator 5 arbitrates the clock cycle of output (instruction execution 10) of this operation instruction 3b with respect to the operation unit 11.

Each operation unit (ALU) 11 executes an arithmetic operation on the basis of instruction execution 10 of the operation instruction 3b, and outputs an execution result 14 to the execution result bus 15.

The detailed operations of the respective units in the parallel processor with the above arrangement will be described below.

Figure 2:
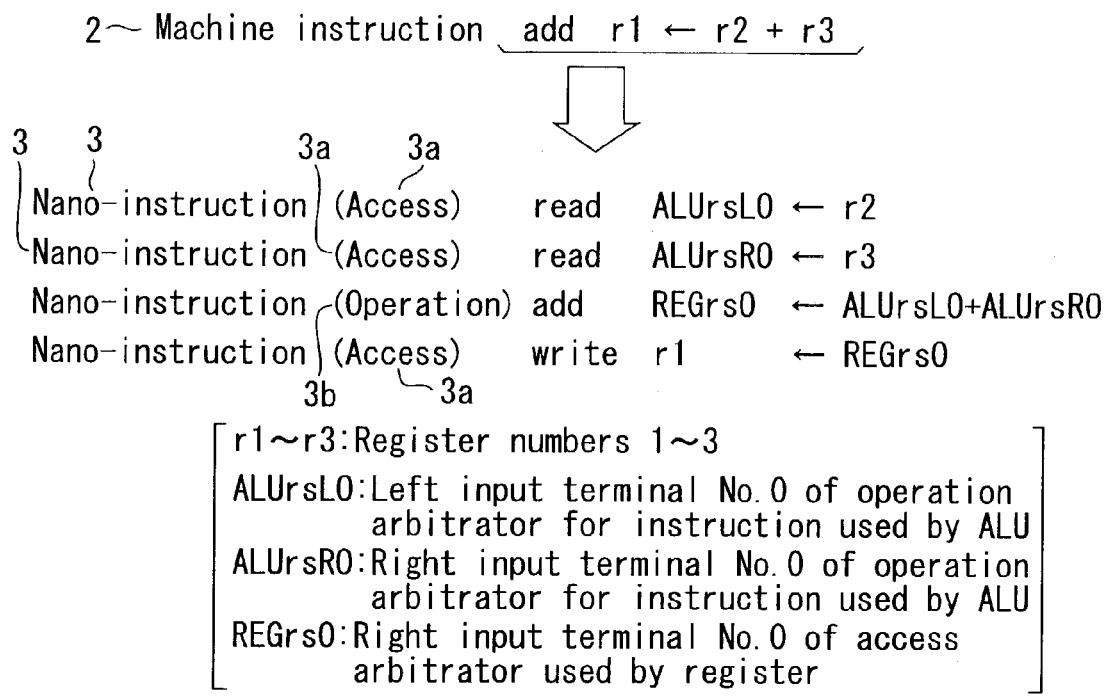
FIG. 2 is a view showing an instruction split process of an instruction change unit incorporated in the parallel processor of the first embodiment.

FIG. 2 shows an example of an instruction change process when the instruction change unit 1 changes a machine instruction 2 to be executed into a plurality of nano-instructions.

An externally input machine instruction 3 [add r1 ←r2 +r3], which indicates addition for adding the data of registers r2 and r3 and storing the sum in another register r1 is split into a total of four nano-instructions 3, i.e., an access instruction 3a [read ALUrsL0 ←r2] that reads out the data of register r2 and inputs the readout data to left input terminal No. 0 of an operation arbitrator 5, an access instruction 3a [read ALUrsR0←r3] that reads out data of register r3 and inputs the readout data to right input terminal No. 0 of the operation arbitrator 5, an operation instruction 3b [add REGrs0 ←ALUrsL0+ ALUrsR0] that adds data of right and left input terminals No. 0 and inputs the sum to input terminal No. 0 of the access arbitrator 4, and an access instruction 3a [write r1←REGrs0] that writes data of input terminal No. 0 of the access arbitrator 4 to register r1.

Furthermore, this instruction change unit 1 has a used register number expansion function of re-designating another new register for the storage address in the multi-bank register file 9 of an operation result (execution result 14) of an operation instruction 3b for each operation instruction 3b.

More specifically, the number of registers specified by an instruction set of a normal processor is very small. This is because simultaneous execution of instructions is not assumed, but instructions are executed time-serially. However, if this state is applied to the multi-bank register file 9 which is adopted by the parallel processor, and has a plurality of banks 12 each having a plurality of registers 12a, data to be operated on by operation instructions and their operation results are more likely to be stored in an identical bank 12, thus readily causing bank access contention.

For this reason, another new register is re-designated for the storage address of each operation result (execution result 14) for each operation instruction 3b.

Figure 3:
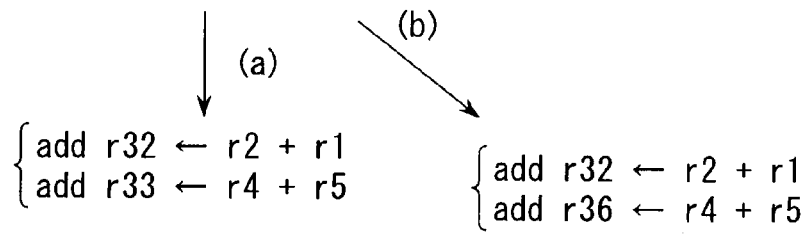
FIG. 3 is a view showing a used register number expansion process of the instruction change unit in consideration of the bank configuration incorporated in the parallel processor of the first embodiment.

This example will be explained using FIG. 3.

When other new registers r32 and r33 are re-designated for storage registers r3 and r4 of operation results of machine instructions 2 [add r3=r2+r1] and [add r4=r4+r5] that read out respective data of registers 12a, add the readout data, and write the sums in other registers 12a like (a) [add r32=r2+r1], [add r33=r4+r5] the respective registers 12a of the multi-bank register file 9 can be effectively used. In addition, the probability that the data to be operated by each operation instruction and its operation result are stored in an identical bank becomes low, and the probability of occurrence of bank access contention can be reduced.

Furthermore, successive instructions are more likely to be executed in an identical block cycle. Hence, when new registers r32 and r36, which are largely separated to belong to at least different banks 12, are re-designated in place of storage registers r3 and r4 of operation results of respective instructions like (b) [add r32=r2+r1], [add r36=r4+r5] the probability of occurrence of bank access contention can be further reduced.

Figure 5:
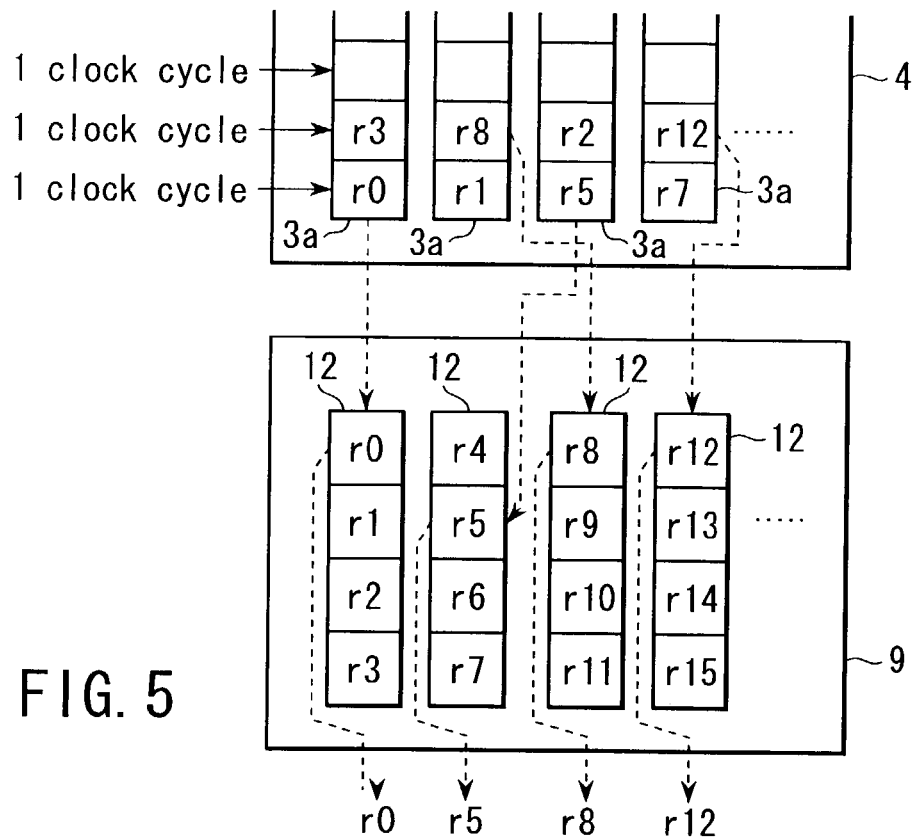
FIG. 5 shows an access arbitration process of an access arbitrator incorporated in the parallel processor of the first embodiment.

The practical operation of the access arbitrator 4 will be explained below using FIG. 5.

As described above, the access arbitrator 4 arbitrates the output clock cycles of respective access instructions 3a with respect to the multi-bank register file 9 so as to prevent contention among access instructions 3a which are simultaneously output from the instruction change unit 1 in an identical bank 12 in the multi-bank register file 9.

In this access arbitrator 4, a plurality of access instructions 3a to be executed in respective clock cycles are temporarily stored in queues. In FIG. 5, access instructions 3a to registers r0, r1, r5, r7, . . . are stored in the first row, and those to registers r3, r8, r2, r12, . . . are stored in the second row. In this case, the first row includes registers r0 and r1 which belong to the identical 0th bank 12. Furthermore, the first row includes registers r5 and r7 which belong to the identical second bank 12. If respective access instructions 3a in the first row are executed intact, bank access contention occurs.

Hence, arbitration is made by exchanging some of the access instructions to be executed in the first clock cycle with some of access instructions 3a in the second row, so as to prevent bank access contention among access instructions to be executed in the first clock cycle. More specifically, access instructions to register r0 in the first row, registered r8 in the second row, register r5 in the first row, and register r1 12 in the second row are executed in the first clock cycle.

Then, access instructions in the first row, which are not executed in the first clock cycle, are preferentially assigned to access instructions to be executed in the second clock cycle, and access instructions in the second or third row are selectively assigned to the remaining access instructions under the condition that bank access contention is avoided.

In this way, since the access arbitrator 4 arbitrates the execution timings among access instructions 3a, the probability of occurrence of contention of access instructions 3a in the multi-bank register file 9 can be greatly reduced without increasing the total wait time of access instructions 3a. Since queues are formed in correspondence with banks, the aforementioned arbitration can be easily implemented.

In the parallel processor of the first embodiment with the above arrangement, the instruction change unit 1 splits each externally input machine instruction 2 into a plurality of nano-instructions 3 (3a, 3b) each of which includes at least one of an access instruction 3a and operation instruction 3b, and allows instruction execution of nano-instructions 3 (3a, 3b) at their own best timings.

Figure 6A:
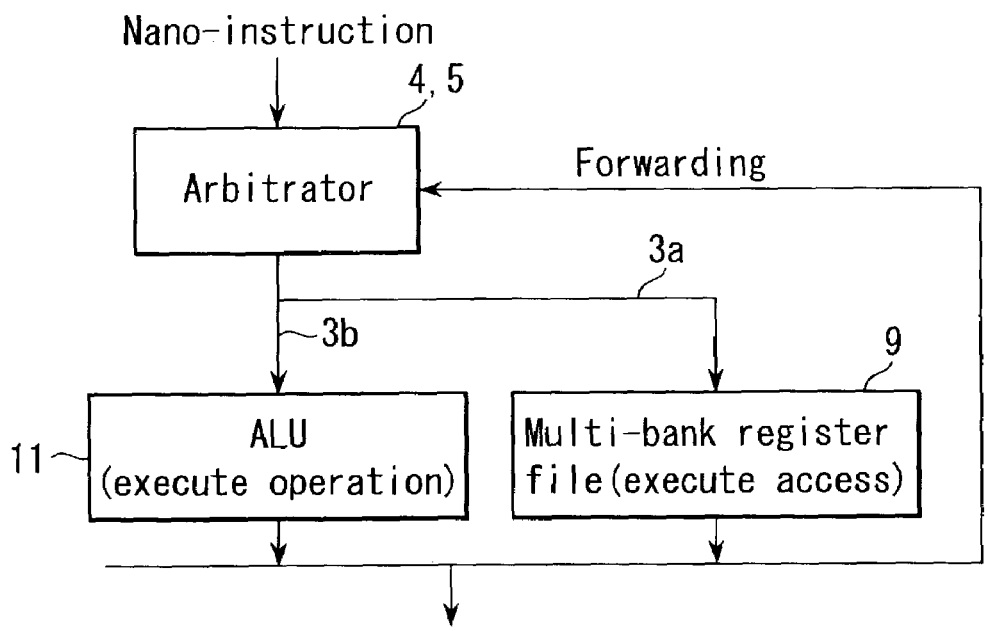
FIG. 6A is a block diagram showing the processing sequence in the parallel processor of the first embodiment.

As shown in FIG. 6A, an access instruction 3a to the multi-bank register file 9 and an operation instruction 3b to the operation unit 11 have an identical function level. As a result, the execution timings of a machine instruction 2 which has no access instruction 3a to the register and a machine instruction 2 which can acquire operands only by forwarding can be set earlier, thus increasing the processing speed of the parallel processor.

Figure 6B:
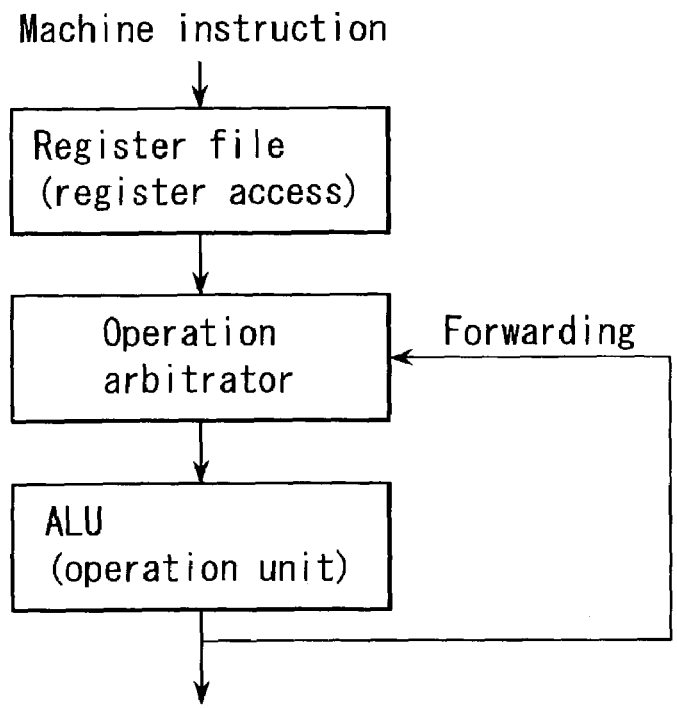
FIG. 6B is a block diagram showing the processing sequence in a conventional parallel processor.

Note that FIG. 6B shows the execution sequence of a machine instruction in a conventional parallel processor which does not change a machine instruction 2 into nano-instructions 3 which include access instructions 3a and operation instructions 3b. All machine instructions go through a register file (register access), operation arbitrator, and operation unit, and the presence/absence of execution is checked each time. Therefore, a wasteful judgment process takes place, resulting in low processing efficiency.

Furthermore, in the parallel processor of the first embodiment, the execution timings of access of respective access instructions 3a with respect to the multi-bank register file 9 are arbitrated so as to prevent the access instructions 3a from contending in identical bank 12 in the multi-bank register file 9, as described above. As a result, the probability of occurrence of contention of access instructions 3a in the multi-bank register file 9 can be greatly reduced, thus increasing the processing speed of the parallel processor.

Moreover, other new registers are re-designated for the storage registers of the operation results of respective operation instructions 3b in respective operation instructions 3a. As a result, instructions are executed using many registers 12a in the multi-bank register file 9. Hence, the probability of occurrence of bank access contention can be further suppressed, and the processing speed of the parallel processor can be further increased.

In this manner, since the multi-bank register file 9 which has a small number of ports and a small packaging area can be incorporated in this parallel processor without any processing speed drop, the whole parallel processor can be made compact.

Figure 7:
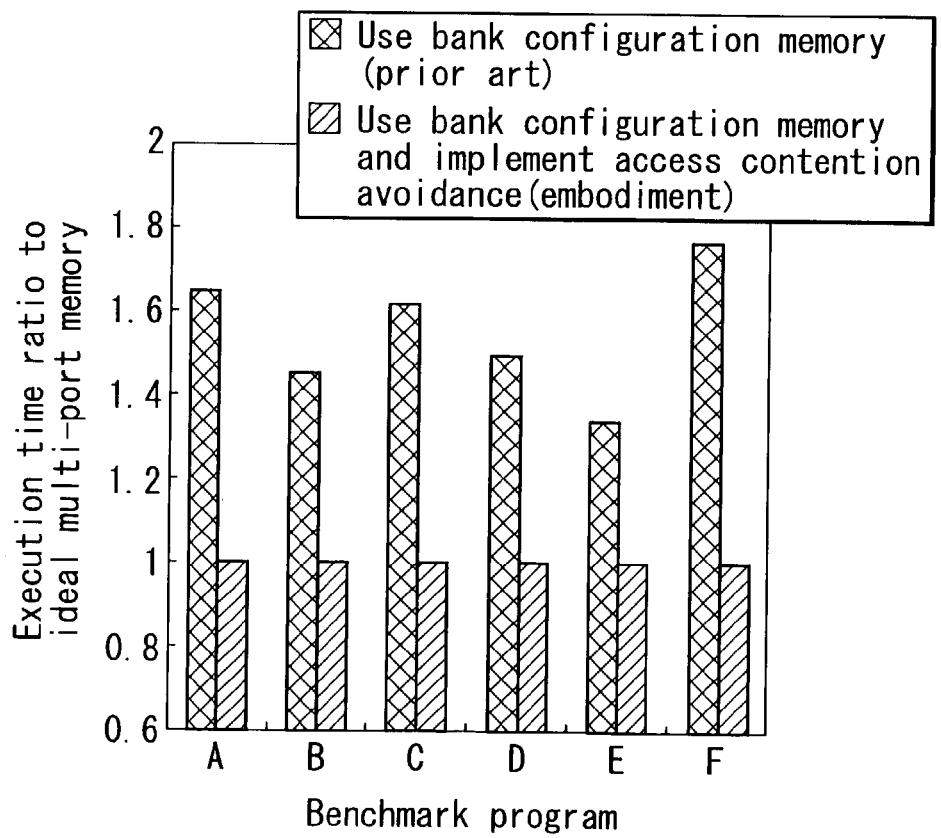
FIG. 7 shows the benchmark test result for the parallel processor of the first embodiment.

FIG. 7 shows the benchmark test results of the parallel processor of the first embodiment which splits machine instructions into nano-instructions and implements access contention avoidance, and a conventional parallel processor which uses only a multi-bank register memory (bank configuration memory). Test results using benchmark programs A to F are indicated by an execution processing time ratio when the processing time of a reference parallel processor which has an ideal (theoretical) multi-port memory with no regard to the packaging area is 1.

Note that the parallel processor used for FIG. 7 has instruction sets compatible to the R3000 processor which can simultaneously execute four instructions and is available from MIPS Technologies, Inc. Also, the reference parallel processor uses a connectional multi-port register file having 12 ports.

As can also be understood from the test results in FIG. 7, the processing speed of the parallel processor of this embodiment can be greatly improved compared to that of the conventional parallel processor that does not implement any access arbitration. Also, a processing speed nearly equivalent to that of the reference parallel processor having an ideal (theoretical) multi-port memory can be assured.

Figure 8:
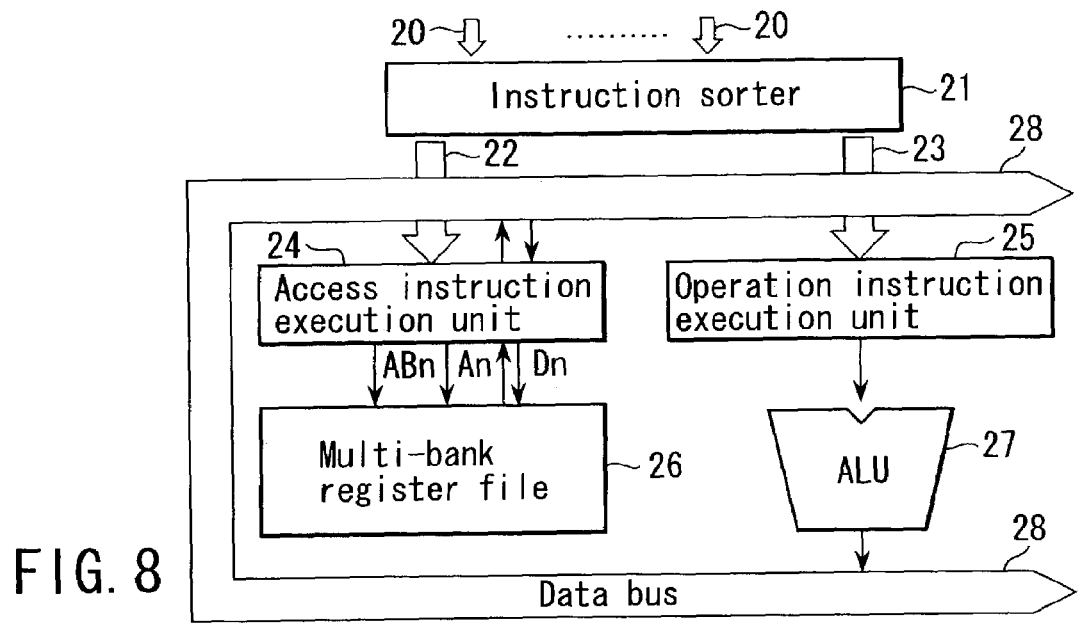
FIG. 8 is a schematic block diagram showing the arrangement of a parallel processor according to a second embodiment of the present invention.

FIG. 8 is a schematic block diagram showing the arrangement of a parallel processor according to the second embodiment of the present invention.

The parallel processor of the second embodiment can simultaneously execute N instructions 20 which are externally input in one clock cycle.

An instruction sorter 21 sorts N input instructions 20 into access instructions 22 and operation instructions 23, and respectively outputs them to an access instruction execution unit 24 and an operation instruction execution unit 25. The access instruction execution unit 24 makes accesses designated with bank addresses ABn to a multi-bank register file 26 and register addresses An in banks on the basis of a maximum of N input access instructions 22. The operation instruction execution unit 25 executes a maximum of N input operation instructions 23 with respect to an operation unit (ALU) 27. The access results and operation results are output onto a data bus 28.

Figure 9:
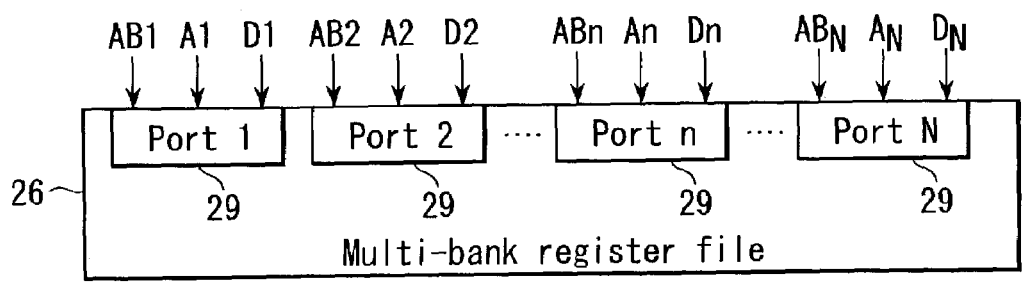
FIG. 9 shows ports of a multi-bank register file incorporated in the parallel processor of the second embodiment.

The multi-bank register file 26 has N ports 29 (Nos. 1 to N), as shown in FIG. 9. Each port 29 inputs/outputs m-bit bank address ABn required to execute one access instruction 22, register address AN in a bank, and data Dn to be read out or written.

The access instruction execution unit 24 simultaneously executes a maximum of N access instructions 22, which are input in one clock cycle from the instruction sorter 21 via the N ports 29 (Nos. 1 to N) with respect to registers in respective banks of the multi-bank register file 26.

However, if a plurality of access instructions 22 designate an identical bank, access contention occurs. In this case, the access instruction execution unit 24 prohibits access instructions 22 other than selected ones of contending access instructions 22 from accessing so as to avoid access contention, and outputs identical access instructions 22 to the multi-bank register file 26 in the next clock cycle. In this manner, the access instruction execution unit 24 also has an access contention avoidance function.

Figure 10:
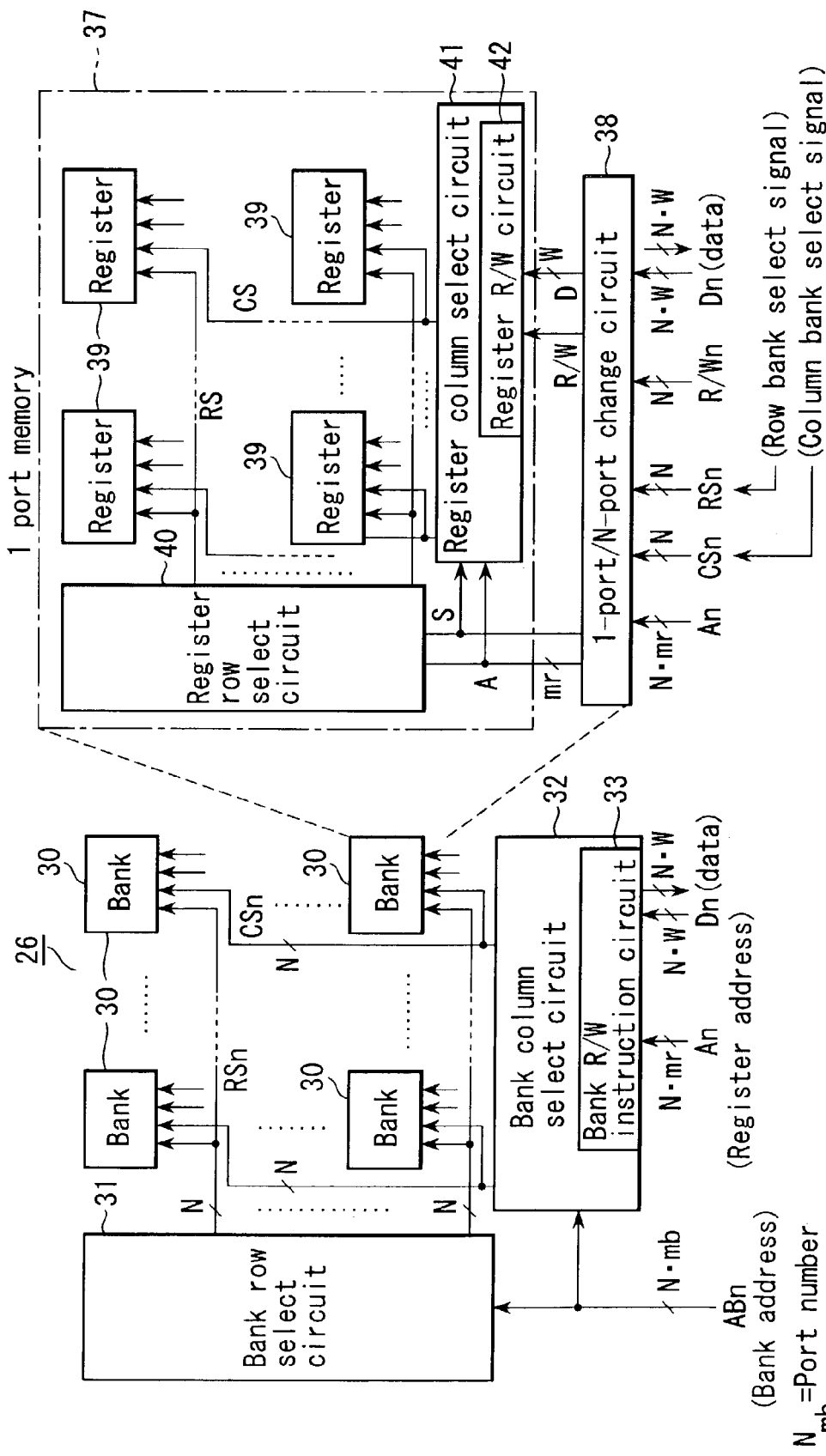
FIG. 10 is a schematic block diagram showing the arrangement of the multi-bank register file incorporated in the parallel processor of the second embodiment.

FIG. 10 is a schematic block diagram showing the arrangement of the multi-bank register file 26.

This multi-bank register file 26 incorporates a plurality of banks 30 which are arranged in a matrix, a bank row select circuit 31, and a bank column select circuit 32.

The bank row select circuit 31 outputs bank row select signals RSn to banks 30 which belong to rows designated by N bank addresses ABn input to the 1st to Nth ports 29. The bank column select circuit 32 outputs bank column select signals CSn to banks 30 which belong to columns designated by N bank addresses ABn input to the 1st to Nth ports 29. The bank row and column select signals RSn and CSn specify one bank 30 designated by each bank address ABn to be active.

A bank read/write instruction circuit 33 arranged in the bank column select circuit 32 outputs 1st to Nth register addresses An, 1st to Nth data Dn, and 1st to Nth read/write control signals R/Wn as access instructions to respective banks 30. Since only a bank 30 designated by the bank row and column select signals RSn and CSn is active, the bank read/write instruction circuit 33 consequently outputs an access instruction to a corresponding register with respect to the bank 30 designated by the bank row and column select signals RSn and CSn.

Therefore, each of the banks 30 which are arranged in a matrix also has N sets of ports for inputting/outputting N register addresses An, N data Dn, N read/write control signals R/Wn.

In FIG. 10, each of the banks 30 which are arranged in a matrix is formed by a 1-port memory 37 and a 1-port N-port change circuit 38 as a port number change circuit.

The 1-port memory 37 incorporates a plurality of registers 39 arranged in a matrix, a register row select circuit 40, and a register column select circuit 41.

The register row select circuit 40 outputs a register row select signal RS to respective registers 39, which belong to a row designated by one register address A. This register address A is designated by the bank read/write instruction circuit 33 via the 1-port/N-port change circuit 38. The register column select circuit 41 outputs a register column select signal CS to respective registers 39, which belong to a column designated by one register address A. This register address A is designated by the bank read/write instruction circuit 33 via the 1-port/N-port change circuit 38. Therefore, one register 39 to be accessed is specified by the register row and column select signals RS and CS.

A register read/write circuit 42 incorporated in the register column select circuit 41 executes access, which is instructed by the bank read/write instruction circuit 33 via the 1-port/N-port change circuit 38, to one register 39 designated by the register row and column select signals RS and CS.

The 1-port/N-port change circuit 38 arranged in each bank 30 will be explained below.

This 1-port/N-port change circuit 38 selects from N ports corresponding to a plurality of accesses, which are designated by the bank read/write instruction circuit 33 to different banks 30 and are to be executed in an identical clock cycle, the one port corresponding to the access to a register 39 designated by the register row and column select signals RS and CS.

Figure 11:
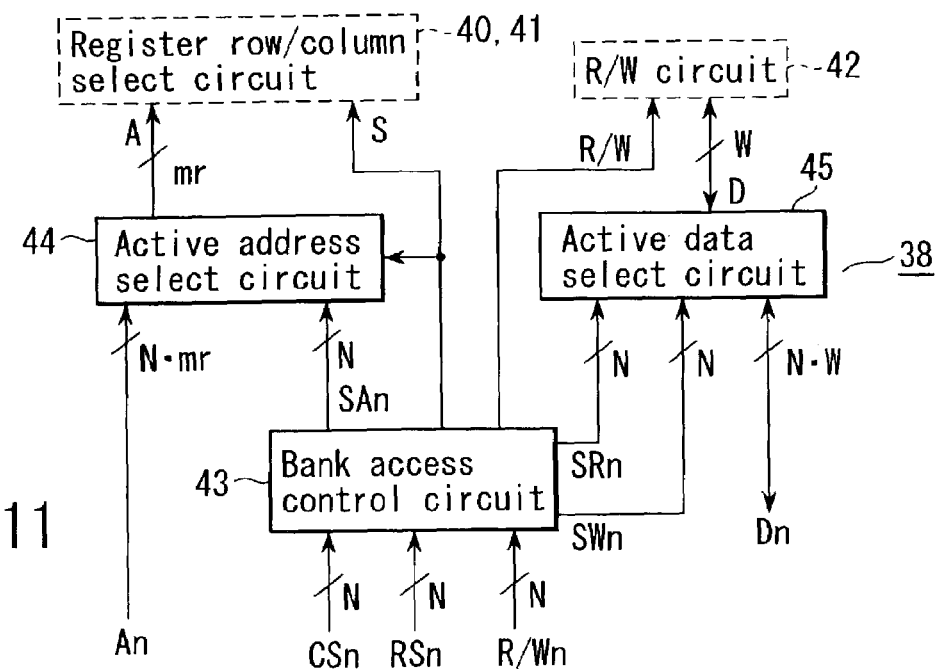
FIG. 11 is a block diagram showing the arrangement of a 1-port/N-port change circuit incorporated in the parallel processor of the second embodiment.

More specifically, as shown in FIG. 11, this 1-port/N-port change circuit 38 comprises a bank access control circuit 43 an active address select circuit 44, and an active data select circuit 45.

The bank access control circuit 43 generates and outputs N port address select signals SAn to select the register address of a port 29 that designates the corresponding bank 30 and a bank select signal S indicating that the corresponding bank 30 is selected, on the basis of N bank row select signals RSn and N bank column select signals CSn input to the N ports connected to the corresponding bank 30.

The active address select circuit 44 selects one register address A designated by the address port select signals SAn output from the bank access control circuit 43 out of N register addresses An connected to the corresponding bank 30. The active address select circuit 44 outputs the selected register address A to the register row select circuit 40 and register column select circuit 41. The bank select signal S is also supplied to the register row select circuit 40 and register column select circuit 41.

Furthermore, the bank access control circuit 43 generates and outputs N port read select signals SRn to select a port 29 that designates the corresponding bank 30 for register-read access, and N port write select signals SWn to select a port 29 that designates the corresponding bank 30 for register-write access, on the basis of N bank row select signals RSn and N bank column select signals CSn input to the N ports connected to the corresponding bank 30.

Moreover, the bank access control circuit 43 extracts one read/write control signal R/W that designates the corresponding bank 30 (1-port memory 37) out of N read/write control signals R/Wn input to the corresponding bank 30. The circuit 43 outputs the extracted read/write control signal R/W to the register read/write circuit 42.

The active data select circuit 45 selects data D, designated by read/write and port select signals SRn and SWn output from the bank access control circuit 43, out of N data Dn input/output from the corresponding bank 30. The active data select circuit 45 inputs/outputs the selected data D to the register read/write circuit 42.

In this way, the register row select circuit 40 and register column select circuit 41 designate one register 39 using one input register address A. The register read/write circuit 42 executes an access to the one input/output data D with respect to the one register 39 designated based on one read/write control signal R/W.

Therefore, each register 39 which forms the bank 30 has only one set of ports which input/output one register row select signal RS, one register column select signal CS, one read/write control signal R/W, and data D.

In the parallel processor of the second embodiment with the above arrangement as well, access instructions 22, which are input in one clock cycle and designate N bank addresses AB and a register address A in each bank, are executed in an identical clock cycle with respect to registers 39 formed in a matrix in each of the plurality of banks 30 arranged in a matrix in the multi-bank register file 26.

Furthermore, the banks 30 and the registers 39 which form each bank 30 are hierarchically arranged in the multi-bank register file 26 incorporated in the parallel processor of the second embodiment, as shown in FIG. 10. The row select circuits 31 and 40, and the column select circuits 32 and 41 select the banks 30 and registers 39. The structure of a memory element having hierarchically arranged multi-ports is called a Hierarchical Multi-port Memory Architecture (HMA).

Since the multi-bank register file 26 adopts the HMA structure, the area required for this multi-bank register file 26 can be greatly reduced compared to that required for a conventional multi-port cell type multi-bank register file having the same storage size.

Moreover, each bank 30 incorporates the 1-port/N-port change circuit 38 to change the N ports connected to the bank 30 into one port required to actually access one register 39 in this bank 30. Therefore, since each register 39 needs only one port, the N ports of the multi-bank register file 26 have to be implemented only outside of this bank 30.

Note that the present invention is not limited to the multi-bank register file 26 incorporated in the parallel processor of the second embodiment shown in FIG. 10.

The registers 39 in each bank 30 are arranged in the normal order of register addresses A in place of a two-dimensional layout, and a bank read/write circuit is arranged in place of the bank read/write instruction circuit 33. The bank read/write circuit can access a register designated by the register address A in the bank 30, which is designated by the bank row and column select circuits 31 and 32.

Furthermore, respective banks in the multi-bank register file can be accessed using a normal cross bar switch network structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A parallel processor which simultaneously executes a plurality of instructions in one clock cycle, comprising:
   an instruction change unit which splits each of a plurality of simultaneously input machine instructions into a plurality of nano-instructions each of which includes at least one of an access instruction and an operation instruction;
   a plurality of operation units which execute operation instructions split by the instruction change unit;
   a multi-bank register file in which a plurality of banks each having a plurality of registers are formed, and which is accessed by an access instruction which is split by the instruction change unit and designates a bank and register;
   a plurality of operation arbitrators, which are interposed between the instruction change unit and the operation units, and arbitrate output clock cycles of said operation instructions with respect to the operation units;

an access arbitrator which is interposed between the instruction change unit and the multi-bank register file, and arbitrates output clock cycles of respective access instructions with respect to the multi-bank register file so as to prevent the access instructions simultaneously output from the instruction change unit from contending in an identical bank, the access arbitrator having a plurality of queues, each including a plurality of registers which temporarily store access instructions simultaneously output from the instruction change unit, and the access arbitrator changing output timing of an access instruction stored in a register of a row of one queue with output timing of an access instruction stored in a register of another row of the queue; and an execution result bus which feeds back access results to the multi-bank register file, and operation results in the operation units to the operation and access arbitrators, wherein when an input access instruction is a write instruction, data to be written by which is given by an execution result of an operation, and the execution result is not given yet as an execution result from the execution results bus, the access arbitrator arbitrates the output clock cycle of this access instruction with respect to the multi-bank register file; and when an input operation instruction is an operation instruction that uses an execution result of access executed for the multi-bank register file, and the execution result is not given yet via the execution result bus, each operation arbitrator arbitrates the output clock cycle of this operation instruction with respect to the corresponding operation unit.

2. A processor according to claim 1, further comprising used register number expansion means for re-designating other new registers for storage registers of operation results of operation instructions split from each machine instruction for respective operation instructions.

3. A processor according to claim 1, further comprising used register number expansion means for re-designating new registers in different banks for storage registers of operation results of operation instructions split from each machine instruction for respective operation instructions.

4. A parallel processor according to claim 1, wherein the multi-bank register file includes:

a plurality of banks;

a bank row select circuit which outputs a bank row select signal to respective banks that belong to a row designated by the bank address;

a bank column select circuit which outputs a bank column select signal to respective banks that belong to a column designated by the bank address; and a bank read/write circuit which executes access to a register designated by the register address in the bank designated by the bank row and column select signals.

5. A parallel processor according to claim 1, wherein the multi-bank register file includes:

a plurality of banks;

a bank row select circuit which outputs a bank row select signal to respective banks that belong to a row designated by the bank address;

a bank column select circuit which outputs a bank column select signal to respective banks that belong to a column designated by the bank address; and a bank read/write circuit which executes access to a register designated by the register address in the bank designated by the row and column bank select signals, each bank including:

a plurality of registers;

a register row select circuit which outputs a register row select signal to respective registers that belong to a row designated by the register address designated by the bank read/write instruction circuit;

a register column select circuit which outputs a register column select signal to respective registers that belong to a column designated by the register address designated by the bank read/write instruction circuit; and a register read/write circuit which executes access, that is instructed by the bank read/write instruction circuit, to the register designated by the row and column register select signals.

6. A processor according to claim 5, wherein each bank has a port number change circuit which selects from a plurality of ports corresponding to a plurality of accesses that are designated by the bank read/write instruction circuit and are to be executed in one clock cycle, one port corresponding to an access to the corresponding bank designated by the bank row and column select signals and to the register designated by the register row and column select signals.

* * * * *